W. C. TURNBOW.
TRUCK.
APPLICATION FILED DEC. 11, 1916.
1,242,390.
Patented Oct. 9, 1917.
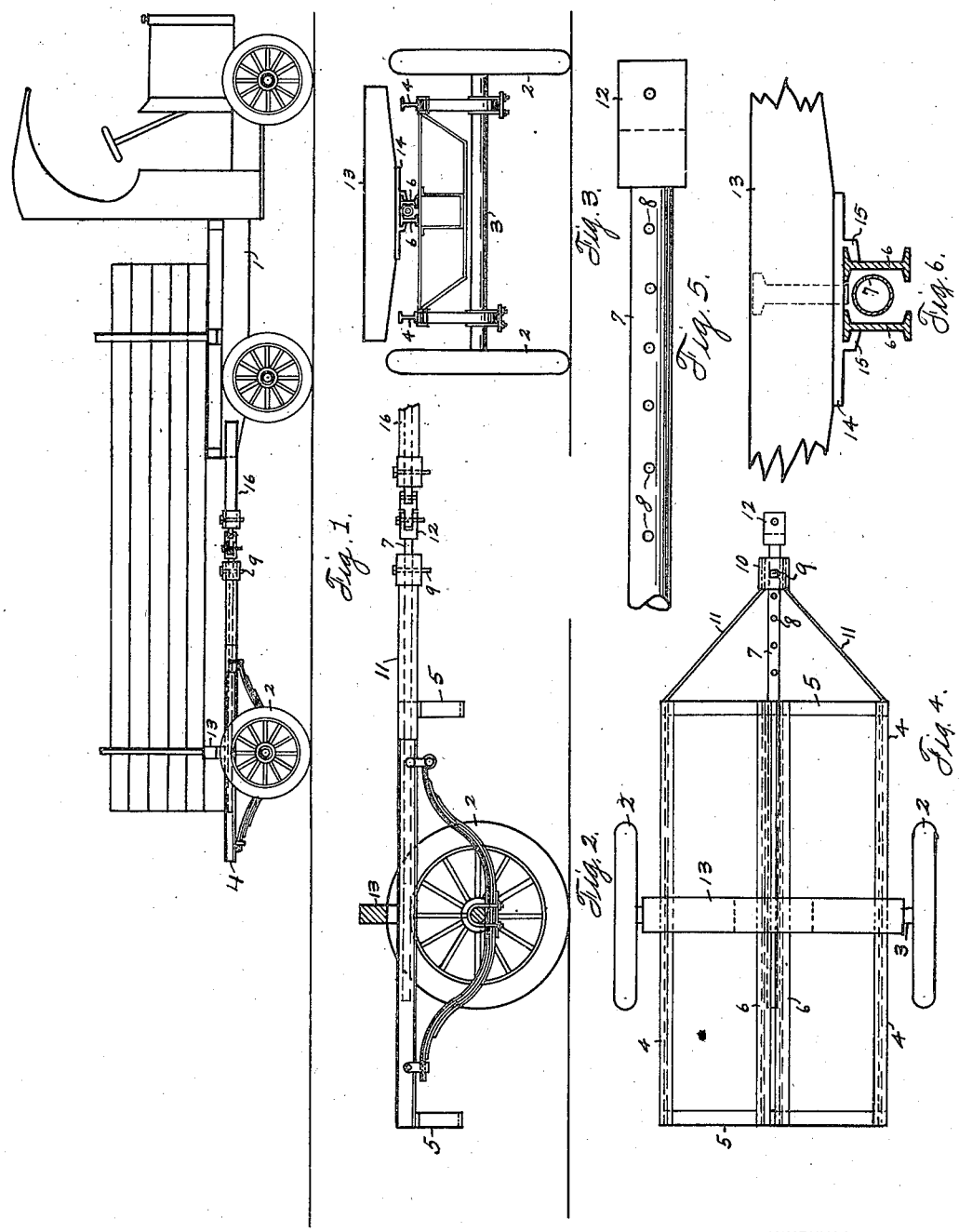
INVENTOR
William C. Turnbow
BY
Hardway Carter
ATTORNEY

UNITED STATES PATENT OFFICE.

WILLIAM C. TURNBOW, OF HOUSTON, TEXAS.

TRUCK.

1,242,390.

Specification of Letters Patent.   Patented Oct. 9, 1917.

Application filed December 11, 1916. Serial No. 136,131.

*To all whom it may concern:*

Be it known that I, WILLIAM C. TURN-BOW, a citizen of the United States, residing at Houston, in the county of Harris and State of Texas, have invented certain new and useful Improvements in Trucks, of which the following is a specification.

This invention relates to new and useful improvements in trucks and embodies a trailer connected in a novel manner to a truck of the ordinary form, so that the trailer wheels will track the rear truck wheels.

The object of the invention is to provide a device of the character described which is particularly designed for use in transporting lumber and other long loads.

A further feature of the invention resides in the novel means provided for connecting the trailer to the truck frame.

A further feature of the invention resides in the provision of a bolster for the trailer which directly sustains the load and which is slidably mounted upon said trailer.

With the above and other objects in view the invention has particular relation to certain novel features of construction, operation and arrangement of parts, an example of which is given in this specification and illustrated in the accompanying drawings wherein:—

Figure 1 is a side elevation of the truck showing the trailer connected thereto.

Fig. 2 is a side elevation of the trailer.

Fig. 3 is a rear view thereof.

Fig. 4 is a plan view thereof.

Fig. 5 is an enlarged fragmentary view of the trailer coupling pole, and

Fig. 6 is a fragmentary view of the trailer bolster showing the bearing upon which it is mounted.

Referring now more particularly to the drawings wherein like numerals of reference designate similar parts in each of the figures, the numeral 1 refers to a truck of the ordinary and well known form which has the rigid, rearwardly extending coupling member 16 secured to the frame thereof.

The numerals 2, 2, designate the wheels of the trailer which are mounted upon the axle 3, said axle supporting a frame work composed of side members 4, 4, preferably formed of I beams and connected at their respective ends by the end members 5, 5.

Connected at their respective ends to said front and rear end members are the I beams 6, 6, which are spaced a short distance apart to form a space for the reception of the coupling pole 7. This pole is preferably formed of a metal pipe having a plurality of bearings as 8 spaced apart to receive the linch pin 9, and by reason of which the trailer can be adjusted toward and from the track in accordance with the length of the load to be carried. A bearing member 10 is provided which is rigidly connected to the front end of the trailer frame by means of braces 11, 11, and the coupling pole 7 extends through this bearing member, said member being provided with vertically alined orifices which also receive said linch pin, said pin securing said coupling pole to the trailer. The forward end of the coupling pole has a coupling member 12 having a hinged connection with the coupling member 16 by means of which the trailer is secured to the truck. A bolster 13 is mounted upon the trailer frame, to the under side of which is pivoted the plate 14 having the clencher flanges 15, 15, engaging over the adjacent flanges of the I beams 6, 6, forming sliding bearings.

In the movement of the vehicle over roads and in going around curves, there will be a certain amount of movement of the load relative to the trailer and the bolster 12 has been slidably mounted to accommodate this relative movement; and the coupling member 16 is of such a length as to cause the trailer wheels to track the rear truck wheels in going around curves in the road and in turning corners. By the use of rigid coupling members, connected by hinged couplings as above described, any number of trailers may be employed and each will be forced to track the one in front, thus enabling a train of trailers to pass over any road however irregular it may be; this result is accomplished by making the braces which support the respective coupling members of such a length as to bring the hinged coupling equidistant from the trailer and truck, thus causing each trailer to track the one next in front of it.

What I claim is:

1. A vehicle including the combination with a truck of a trailer, said trailer embodying a frame and carrier wheels whereon the frame is mounted, a coupling pole carried by the trailer and capable of adjustment relative thereto, the front end of said coupling pole being connected to the truck by means of a hinged coupling, a bolster, and a member slidably mounted on the frame of the trailer to which the bolster is pivoted.

2. In a device of the character described a trailer consisting of carrier wheels, a frame work mounted thereon, a pair of I beams secured to the frame work and spaced apart forming a housing, a coupling pole movable lengthwise within said housing, the forward end of which is provided with a coupling member by means of which said trailer may be coupled to a truck and a load carrying bolster connected to and having a slidable engagement with the trailer frame.

3. A device of the character described including front and rear wheels, a frame supported by each, a rigid coupling member fixed to each frame, said members being of equal length and being connected together by a flexible joint to cause said wheels to track in turning, a member having a slidable connection with one of said frames and a bolster pivoted to said member.

4. A vehicle including the combination with a truck, of a trailer, said trailer embodying a frame and carrier wheels whereon the frame is mounted, a pair of I beams secured to the frame of the trailer and spaced apart forming a housing, a coupling pole within said housing, rigid braces secured to the front end of said frame and extending forwardly therefrom and formed into a bearing member through which the coupling pole extends, means for securing said coupling pole against movement in said bearing member, a coupling member fixed rigidly to the rear end of the truck and flexibly connected to the front end of the coupling pole and a bolster having a slidable connection with said I-beams.

5. A device of the character described including front and rear wheels, a frame supported by each, a rigid coupling member fixed to each frame, said members being of equal length and being connected by a flexible joint to cause said wheels to track in turning, a pair of I-beams secured to one of said frames, a member provided with clencher flanges which engage over the flanges of said I-beams and permit said member to move lengthwise relative to said beams, and a bolster pivoted to said member.

In testimony whereof I have signed my name to this specification in the presence of two subscribing witnesses.

WILLIAM C. TURNBOW.

Witnesses:
E. V. HARDWAY,
FLORENCE JOHNSTON.